United States Patent [19]
Marion

[11] 3,816,332

[45] June 11, 1974

[54] SYNTHESIS GAS PRODUCTION

[75] Inventor: Charles P. Marion, Mamaroneck, N.Y.

[73] Assignee: Texaco Development Corporation, New York, N.Y.

[22] Filed: Apr. 7, 1971

[21] Appl. No.: 132,018

[52] U.S. Cl............... 252/373, 48/212, 48/215, 423/655, 423/656
[51] Int. Cl............................................ C01b 2/14
[58] Field of Search ............... 252/375; 48/212, 215

[56] References Cited
UNITED STATES PATENTS

| | | | |
|---|---|---|---|
| 2,892,685 | 6/1959 | Paul | 48/215 |
| 2,992,906 | 7/1961 | Guptill | 252/373 |
| 2,999,741 | 9/1961 | Dille et al. | 48/215 X |
| 3,022,148 | 2/1962 | Jones | 48/215 |
| 3,232,727 | 2/1966 | Guptill et al. | 252/373 X |
| 3,232,728 | 2/1966 | Reynolds | 252/373 X |
| 3,528,930 | 9/1970 | Schlinger | 252/373 X |
| 3,545,926 | 12/1970 | Schlinger et al. | 252/373 X |
| 3,595,619 | 2/1971 | Slater et al. | 252/373 |
| 3,639,261 | 2/1972 | Slater | 252/373 |

FOREIGN PATENTS OR APPLICATIONS

| 940,960 | 11/1063 | Great Britain | 252/373 |
|---|---|---|---|

*Primary Examiner*—Howard T. Mars
*Attorney, Agent, or Firm*—Thomas H. Whaley; Carl G. Ries

[57] ABSTRACT

This is a process for the production of synthesis gas substantially free from entrained particulate carbon. The product gas is preferably produced substantially free from volatile hydrocarbon contaminants. A feedstock comprising fresh liquid hydrocarbon oil is introduced into a distillation zone and separated into a light liquid hydrocarbon fraction and a heavy liquid hydrocarbon fraction. The light hydrocarbon fraction in admixture with a preheated slurry produced subsequently in a gas scrubbing zone and comprising particulate carbon and said heavy liquid hydrocarbon fraction are introduced into the reaction zone of a free flow noncatalytic synthesis gas generator and reacted by partial oxidation with oxygen and steam at an autogenous temperature in the range of 1,500°–3,000° F. to produce synthesis gas comprising hydrogen, carbon monoxide, and appreciable amounts of entrained particulate carbon. The effluent gas from the reaction zone is cooled by indirect heat exchange and is then scrubbed free of said entrained particulate carbon in a gas scrubbing zone with said heavy liquid hydrocarbon fraction and carbon slurries thereof. The scrubbing zone is preferably maintained at a temperature and pressure so that undue stripping of volatile fractions from the scrubbing fluid is prevented. When desired, water and any vaporized hydrocarbon in the overhead from the scrubber may be condensed out and separated from the product gas stream.

7 Claims, 1 Drawing Figure

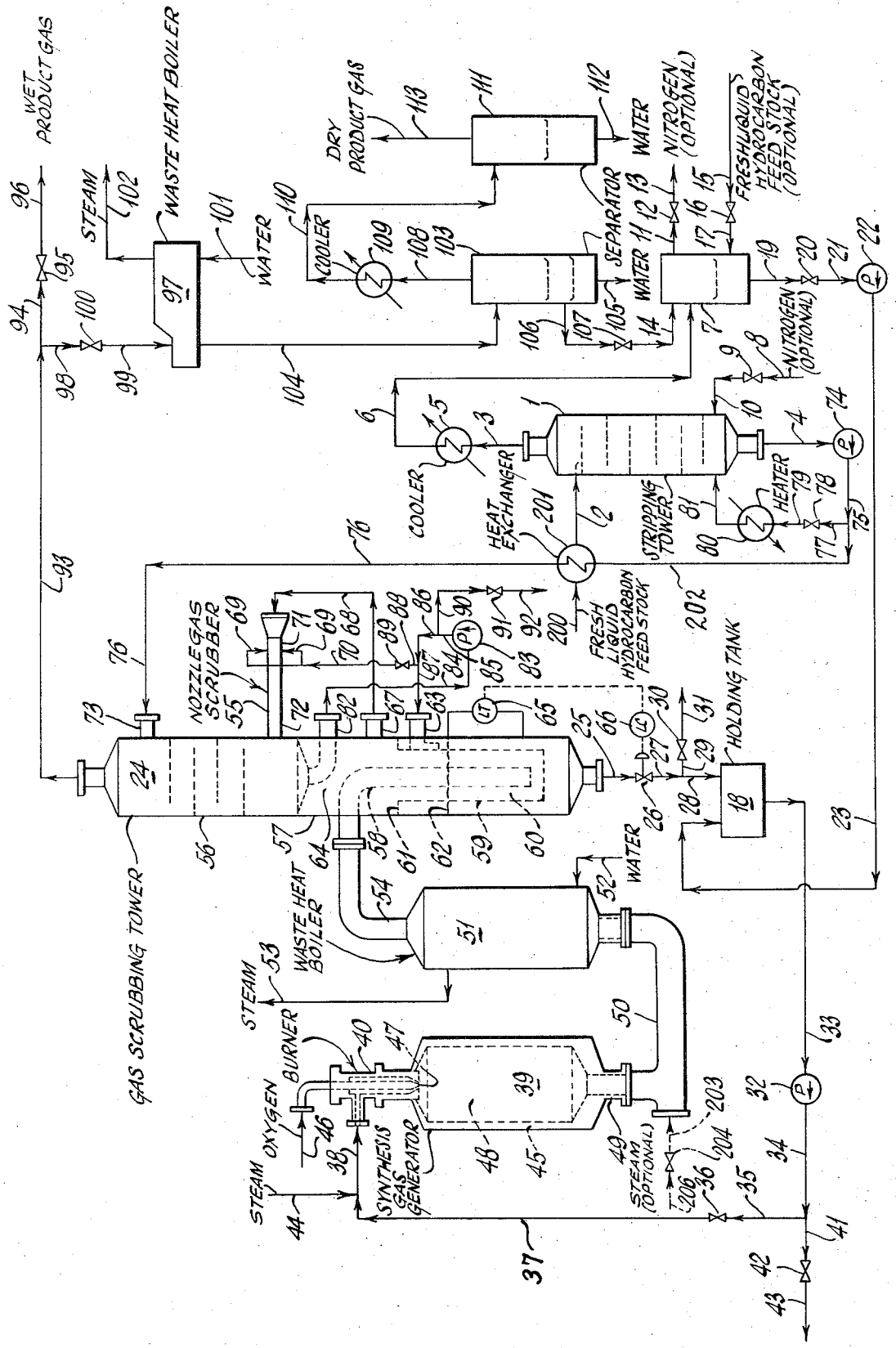

SYNTHESIS GAS PRODUCTION

BACKGROUND OF THE INVENTION

1. Field of the Invention

This invention relates to a process for the production of synthesis gas essentially free from entrained particulate carbon. More specifically the present invention relates to a continuous method of recovering entrained particulate carbon from hot effluent gases leaving a combustion zone.

2. Description of the Prior Art

In the production of synthesis gas, i.e., mixtures of carbon monoxide and hydrogen, by the partial oxidation of a liquid hydrocarbon oil with an oxygen containing gas, from about 0.1 to about 10 weight percent (basis hydrocarbon feed) of entrained particulate carbon is formed. By known methods, the entrained particulate carbon may be removed from the synthesis gas by scrubbing the effluent gas with water, forming a carbon-water slurry. The carbon particles are thereafter separated from the slurry in a conventional manner, such as by filtration, by evaporation, or by extraction with a naphtha. The resulting soot-free water may be recycled to the scrubbing zone for reuse as scrubbing liquid. Disadvantages of the aforesaid carbon recovery processes include the high cost of equipment and extraction fluids and the high water content of the recovered filter cakes, i.e., about 80 to 90 weight percent water, which may require additional expensive drying steps.

Processes which involve directly quenching the product gases leaving the reaction zone at a temperature of 1,800° to 3,000° F. with hydrocarbon oil result in cracking of the hydrocarbon oil due to localized high temperatures. Solid carbonaceous deposits and tarry liquids are thereby produced and deposit downstream on the surfaces of vessels, lines, and heat exchangers. Also, light normally gaseous hydrocarbons including olefins and diolefins may be thereby produced which contaminate the product gas stream and which may react with each other subsequently in the process downstream, forming troublesome gummy deposits. Further, the thermal efficiency of such processes are comparatively inferior; and a system must be provided for the removal and disposal of volatilized oil from the synthesis gas.

SUMMARY

This is a continuous process for the production of synthesis gas, essentially free from entrained particulate carbon and preferably containing substantially no volatile hydrocarbon contaminants, by direct partial oxidation of a liquid hydrocarbon fuel and carbon slurries thereof with oxygen and steam in a flow-type non-catalytic reaction zone at an autogenous temperature within the range of about 1,500° to 3,000° F. A feedstock comprising fresh liquid hydrocarbon oil is introduced into a distillation zone where it is preferably separated into a light liquid hydrocarbon fraction and a heavy liquid hydrocarbon fraction. The initial boiling point of the light liquid hydrocarbon fraction is in the range of about 100° to 900° F.; and the initial boiling point of the heavy liquid hydrocarbon fraction is in the range of about 600° to 1,000° F., and higher. Preferably the heavy liquid hydrocarbon fraction comprises 900+° F. resid. After being cooled to a temperature in the range of about 250°–900° F. and above the dewpoint of water vapor in said effluent gas stream but below the cracking temperature of the heavy liquid hydrocarbon fraction, the effluent gas stream from the reaction zone comprising hydrogen and carbon monoxide and containing entrained particulate carbon is introduced into a gas scrubbing zone where the entrained particulate carbon is recovered from the synthesis gas. This recovery may be accomplished in the scrubbing zone by contacting the partially cooled effluent gas departing from a waste heat boiler with a scrubbing fluid comprising all or a portion of the aforesaid heavy liquid hydrocarbon fraction and carbon slurries thereof. For example, the effluent gas may be contacted with scrubbing fluid first in a dip-leg chamber, then in a nozzle gas scrubber, and last in a multi-tray tower. A portion of the slurry comprising particulate carbon and said heavy liquid-hydrocarbon fraction from the bottom of the scrubbing zone is preferably mixed with a portion of the aforesaid light liquid hydrocarbon fraction from the distillation zone and introduced into the synthesis gas generator as feed. Thus, advantageously the scrubbing zone also serves to preheat a portion of the feed to the gas generator. The scrubbing zone is maintained at a temperature and pressure so that the amount of heavy liquid hydrocarbon scrubbing fluid vaporized therein is minimized, or, at least, maintained in a controlled range of about 0 to 10 mole percent and preferably less than 5 mole percent (basis scrubbing fluid). Alternately, if necessary any water and vaporized hydrocarbon in the overhead from the scrubber may be condensed out of the product gas stream.

It is therefore a principal object of the invention to provide a simple process for producing synthesis gas substantially free from entrained particulate carbon.

Another object of the invention to provide a continuous economical process for recovering particulate carbon entrained in effluent gases for use as feed to the process.

Another object is to provide a low cost thermally efficient method for producing a gaseous stream comprising carbon monoxide and hydrogen that is substantially free from entrained particulate carbon and volatile hydrocarbon contaminants.

Still another object of this invention is to scrub entrained particulate carbon from an effluent stream of product gas with a liquid hydrocarbon oil without cracking the scrubbing fluid and without undue stripping of volatile fractions from the scrubbing fluid.

A still further object is to recover particulate carbon from a gaseous stream without contacting the particulate carbon with water, thereby avoiding emulsions and unnecessary mixing of hydrocarbons with water.

DESCRIPTION OF THE INVENTION

The present invention involves an improved continuous process for the production of synthesis gas, i.e., mixtures of carbon monoxide and hydrogen, which is essentially free from entrained particulate carbon. The product gas is also preferably produced substantially free of volatile hydrocarbon contaminants. Synthesis gas comprising mixtures of carbon monoxide and hydrogen and containing from about 0.1 to 10 weight percent of entrained particulate carbon (basis weight of hydrocarbonaceous feed) along with possibly minor amounts of $CO_2$, $H_2O$, $CH_4$, $H_2S$, and COS is produced in the reaction zone of a free-flow unpacked noncatalytic reaction zone of a partial oxidation synthesis gas generator, such as shown in the drawing. For example, a liquid hydrocarbon oil or a pumpable slurry produced subsequently in the process and comprising particulate carbon and a liquid hydrocarbon oil at a temperature in the range of about 250° to 900° F. is mixed with steam at a temperature in the range of about 300° to 1,000° F. This mixture is then introduced into the reaction zone of a free-flow noncatalytic synthesis gas generator by means of a burner. Suitably, an annulus type burner, such as described in coassigned U.S. Pat. No. 2,928,460 issued to Du Bois Eastman et al, may be employed.

Simultaneously, an oxygen-rich gas at a temperature in the range of about ambient to 1,000° F. and preferably in the range of about 200° to 600° F. is introduced into the reaction zone by means of said burner. The amount of oxygen is controlled so as to prevent complete oxidation of the hydrocarbon feed. The oxygen-rich gas may comprise air, oxygen-enriched air (22 mole percent oxygen or more), and preferably pure oxygen (95 mole percent $O_2$ or more). The atomic ratio of free (uncombined) oxygen to carbon in the feed (O/C ratio) is maintained in the range of about 0.70 to 1.2. From about 0.1 to 5 parts by weight of steam are commonly used per part by weight of liquid hydrocarbon oil.

Oxygen is mixed with the hydrocarbon oil and steam in the reaction zone of the free-flow noncatalytic synthesis gas generator and reacted by partial oxidation at an autogenous temperature in the range of about 1,500° F. to 3,000° F. and at a pressure in the range of about 1 to 250 atmospheres. The effluent product gas leaving the reaction zone has the following composition in mole percent dry basis:
$CO$–40 to 55, $H_2$–40 to 55, $CO_2$–3 to 10, $CH_4$–0.02 to 5, $H_2S$–0 to 1.5, and $COS$–0 to 0.1.

The effluent synthesis gas from the combustion chamber and waste-heat boiler also contains about 0.1 to 10 weight percent (basis weight of hydrocarbon feed) of entrained particulate carbon which may have a deleterious effect in downstream processes if not removed. It is economic therefore to recover this entrained carbon by means of the subject process and to burn same either in the synthesis gas generator as a portion of the feed to produce more synthesis gas or in some other furnace as fuel.

The particulate carbon, also known as free carbon soot, has some unique properties. It is both hydrophilic and oleophilic. It is easily dispersed in water and has a high surface area. For example, the specific surface area of the free carbon soot, as determined by nitrogen absorption, ranges from 100 to 1,200 square meters per gram. The Oil Absorption Number, which is a measurement of the amount of lineseed oil required to wet a given weight of carbon soot, ranges from about 1.5 to 5 cc's of oil per gram of carbon soot. The Oil Absorption Number may be determined by ASTM Method D-281. The particulate carbon has a particle size in the range of .01 to 0.5 microns and commonly has a diameter of about 77 millimicrons. It comprises about 92 to 94 weight percent of carbon and 3 to 5 weight percent of ash. Being formed at high temperatures, it is substantially free from volatile matter.

In my novel process for recovering particulate carbon entrained in hot effluent combustion gases, the effluent gases from the synthesis gas generator are cooled, to a temperature in the range of about 900° to 250° F. but above the dewpoint of water vapor contained therein and below the cracking temperature of the scrubbing oil used in the next step, by indirect heat exchange with boiling water in a gas cooler or waste-heat boiler. The temperature of the cooled effluent gas is maintained above the dewpoint to avoid troublesome water-oil emulsions or mixtures from forming in the next step of the process when a comparatively heavy liquid hydrocarbon oil is used to scrub out the entrained particulate carbon from the effluent gas. Scrubbing the cooled effluent gas with oil was found to be an efficient way to remove and recover the entrained particulate carbon. Further, by direct heat exchange with the hot effluent gas, the oil-carbon slurry which is formed is preheated. Thus, the particulate carbon may be recovered by my process without being contacted with water, which ordinarily is difficult to remove from this porous material. Further, by my process, there is direct recovery from the gas of a preheated water-free soot-oil slurry for use as either fuel or feedstock. Consequently, the entire water quench and water scrubbing circuit, including a mixing section, vessels, pumps, tanks, and heat exchangers, may be eliminated.

Advantageously, the hot effluent gas may be cooled in a waste-heat boiler wherein the sensible heat from the effluent synthesis gas may be utilized to convert water into high-pressure steam having a pressure in the range of about 0 to 3,000 psig, but usually at least 25 psi greater than the gas pressure. In this manner, a high yield of high pressure steam may be recovered. This steam may be used elsewhere in the process. For example, a portion of the steam may be recycled to the reaction zone in admixture with the hydrocarbon slurry feed as previously described, or the heat content of the steam may be utilized in heaters, such as the preheater and reboiler for the fresh feed distillation column to be further described. Further, steam may be fed with the product gas to a water-gas shift converter.

A particular advantage of my process is that substantially all of the fresh liquid hydrocarbon feedstock is normally converted into synthesis gas. However, a part of the fresh liquid hydrocarbon feedstock is first employed as a liquid hydrocarbon scrubbing fluid which is passed counter current through a gas-scrubbing zone in direct contact with said partially cooled synthesis gas. By this means, particulate carbon in the synthesis gas is fully recovered as a preheated slurry of liquid hydrocarbon feed and particulate carbon; and preferably, all of this slurry is pumped into the synthesis-gas generator as feed. Optionally, a portion of said slurry may be used elsewhere in the system as fuel for heaters; or it may be exported for use as fuel. Thus, as previously mentioned, the gas-scrubbing zone may also serve as a heat exchanger wherein the feed to the synthesis gas generator is preheated by the hot product gas, improving thereby the thermal efficiency of the process. Further, there is no net production of carbon soot. The particulate carbon is efficiently recovered by the process and all of it may be economically consumed as feed to the gas generator or as fuel. Preferably, the raw liquid hydrocarbon feedstock has a gravity in the range of about −15° to 40° API, a gross heating value in the range of about 17,000 to 18,500 BTU per pound and is further described in Table I. The raw liquid hydrocarbon oil feedstock may be selected from the following types of liquid hydrocarbon fuels: vacuum residue, shale oil, Bunker fuel oil, fuel oil, crude oil, deasphalter bottoms, thermal-cracker bottoms, tar sand oil, coal tar, heavy coal oil, Gilsonite, bitumen, and mixtures thereof.

By means of conventional petroleum stripping, the fresh raw liquid hydrocarbon feedstock, as previously described, is first operated into one or more light liquid hydrocarbon fractions whose initial boiling points (i.b.p.) per ASTM D86 are in the range of about 100° to 900° F. and a heavy liquid hydrocarbon fraction having an atmospheric i.b.p. in the range of about 600° to 1,000° F., and higher. For example, the feedstock may be separated into two fractions — a heavy liquid hydrocarbon fraction having an i.b.p. of 650° F. or above, and a light liquid hydrocarbon fraction having an i.b.p. of less than 650° F. Preferably, the heavy liquid hydrocarbon fraction comprises the residual liquid after distilling off the light liquid hydrocarbon fraction at a temperature of 900° F. By definition, this heavy cut is referred to herein as the "900+° F. resid." Whereas, preferably all of the light hydrocarbon fractions are utilized as feed to the gas generator, in some instances all or a portion of a light hydrocarbon fraction may be used for other purposes. Usually, the aforesaid separation is effected by simple distillation in a single tower at a pressure of less than 50 psig. However, any type of stripping, including vacuum distillation, which removes the light ends from the bottom fraction to be used for gas scrubbing may be employed.

The preliminary distillation step in my process minimizes the amount of volatile hydrocarbons that would otherwise be stripped from the scrubbing oil and go out of the scrubbing tower along with the scrubbed gaseous product. Optionally, nitrogen, steam, or air may be introduced into the bottom of the distillation tower to decrease the partial pressure of the light ends in the overhead and thereby improve the separation of the incoming fresh liquid hydrocarbon feedstock into the light and heavy liquid hydrocarbon fractions. By using the heavy liquid hydrocarbon fraction and carbon slurries thereof as the liquid scrubbing medium in a gas-liquid scrubbing zone, and by controlling the temperature and pressure of the gas scrubbing zone, the amount of volatilized hydrocarbons passing overhead from the scrubber may be controlled. In this manner contamination of the product gas with volatile hydrocarbons may be substantially avoided.

The gas-liquid scrubbing or contacting zone comprises a suitable arrangement of equipment in which effluent synthesis gas precooled to a temperature in the range of 900° to 250° F. is intimately contacted and scrubbed with the aforesaid heavy liquid hydrocarbon fraction, which is at a temperature in the range of 250° to 900° F. This may be effected for example, by introducing the effluent synthesis gas into a pool of heavy liquid hydrocarbon fraction-particulate carbon scrubbing fluid by means of a first dip-tube unit such as shown in the drawing in bottom chamber 57 of gas-scrubbing tower 24. When required, additional entrained particulate carbon may be removed by passing the effluent gas through a second stage of scrubbing. For example, an orifice-type scrubber or venturi or nozzle scrubber 55, such as shown in the drawing or in Perry's Chemical Engineers' Handbook, Fourth Edition, McGraw-Hill 1963, Pages 18–54 to 56 may be used. By such means the product gas stream may be accelerated through a nozzle-type scrubber and thereby the scrubbing action may be improved. The recommended velocity of the synthesis gas passing axially through the throat of the nozzle-type scrubber generally may range between 100 and 400 feet per second. Suitably about 5 to 10 gallons of heavy liquid hydrocarbon fraction-particulate carbon slurry at a temperature in the range of about 250° to 900° F. per 1,000 standard cubic feet of synthesis gas are injected into the synthesis gas at the throat of the scrubbing nozzle. The high gas velocity atomizes the scrubbing fluid into fine droplets on which the carbon particles collect as the drops are accelerated through the gas stream. The carbon-laden droplets then agglomerate and separate from the gas stream in the upper section of the gas scrubbing tower. The dispersion of liquid hydrocarbon oil droplets in high-velocity product gas is discharged from the scrubbing nozzle and, if necessary, passed through a third stage of scrubbing. For example, the effluent gas stream may be finally contacted with fresh heavy liquid hydrocarbon fraction at a temperature in the range of 250° to 900° F. by means of a second dip-leg unit similar to that previously described. Alternately or in addition, this third-stage scrubbing may be effected in a liquid-gas contacting tray-type column, such as shown in the drawing (upper chamber 56). Suitable liquid-gas tray-type columns are more fully described in Perry's Chemical Engineers' Handbook, Fourth Edition, McGraw-Hill 1963, Pages 18–3 to 5. In one embodiment of my invention the entire scrubbing zone comprises such a liquid-gas tray type column.

Thus, as previously described, the heavy liquid hydrocarbon fraction may flow successively through a three- or four-stage gas-scrubbing zone as the liquid scrubbing medium, countercurrently to the effluent synthesis gas stream which is being scrubbed free of particulate carbon. The concentration of particulate carbon in the liquid scrubbing medium increases as the scrubbing medium flows from the last to the first stage. The heavy liquid hydrocarbon fraction-particulate carbon dispersion leaving the last scrubbing stage contains about 0.2 to 1.5 weight percent of particulate carbon. The particulate carbon-heavy liquid hydrocarbon fuel slurry leaving the first stage contains about 2 to 20 weight percent of particulate carbon. Optionally, these slurries may be drawn off as separate streams for recycle scrubbing or for fuel.

The effluent product gas leaves the gas scrubbing zone substantially free of entrained particulate carbon and at a temperature in the range of about 900° to 250° F. The upper temperature is limited by the cracking temperature of the oil while the lower temperature should be above the dew point. The amount of volatilized scrubbing fluid in the scrubber overhead stream may be maintained in a preferred range of about 0 to about 5 mole percent (basis moles of scrubbing fluid) by using as a scrubbing fluid the 900+° F. resid. heavy liquid hydrocarbon fraction. The pressure in the scrubbing zone is in the range of about 1–250 atmospheres and preferably the same as in the gas generator. A pressure in the range of 3 to 250 atmospheres is most suitable, and especially about 1,500 psig, or above. The temperature of the scrubbing fluid therein is in the range of about 250° to 750° F.

If desired, by limiting the amount of volatile hydrocarbons in the scrubber overhead gas stream, the product gas stream may be used directly as a feedstock in a catalytic process. For example, the scrubber overhead gas stream in admixture with steam may be introduced into a catalytic chamber. By the well-known catalytic water-gas shift reaction at a temperature in the range of about 350° to 1,050° F. and a pressure in the range of about 1 to 250 atmospheres, CO in the scrubber overhead gas stream and $H_2O$ react together to produce $H_2$ and $CO_2$. Any conventional water-gas shift catalyst may be employed in a single bed or a plurality of beds, e.g., iron oxide promoted by 1 to 15 percent by weight of an oxide of a metal such as chromium, thorium, uranium, beryllium and antimony. Suitably, a supported sulfided catalyst such as cobalt-molybdenum oxide, may be used in about two to three beds with quench cooling by injection of condensate between the catalyst beds. The $H_2O/CO$ mole ratio may vary from about 0.5 to 6.0 at the inlet to the catalyst chamber. Preferably, the reaction takes place at a temperature in the range of about 550° to 1,000° F. and at substantially the same pressure as in the synthesis-gas generator, less ordinary line drop. By this means the hydrogen content of the product gas is increased, and effluent product gas may be produced containing a maximum yield of $H_2$ or a particular desired $H_2/CO$ ratio in the range of 0.9 to 4.0. Optionally, the particulate carbon-free synthesis gas may be further purified by standard solvent absorption or cryogenic techniques, or both so as to eliminate any gaseous impurities e.g., $CO_2$, $H_2S$ and COS.

Further advantages of the process follow: (1) The necessity for a complex system to remove oil from the synthesis gas which might otherwise foul catalysts or heat transfer surfaces in downstream units is avoided. Further, the problem of disposing of said recovered oil is eliminated. (2) By reducing the amount of vaporized hydrocarbons in the scrubber overhead gas, smaller lines and heat exchangers may be used. (3) In the gas-scrubbing zone, a feed gas to the shift converter is produced which is essentially free from entrained particulate carbon and substantially free from normally volatile hydrocarbons, while eliminating conventional complex equipment for soot scrubbing with water, carbon extraction with naphtha from the water, mixing the naphtha with oil, and distillation of naphtha from the resulting soot-oil mixture. (4) Heat exchange is simplified as the gas-scrubbing zone serves as a preheater for the liquid hydrocarbon feedstock to the synthesis-gas generator while cooling the synthesis gas to the desired temperature for feeding directly to shift conversion, preferably at substantially the same pressure as produced in the gas generator less ordinary pressure drop in the line. (5) The sensible heat from the shift-converter effluent gas may be utilized to produce export high-pressure steam and to preheat either or both the fresh liquid hydrocarbon oil feedstock and the boiler-feed water.

In another embodiment of the process a dry product gas stream is produced from which all of the volatilized hydrocarbons are condensed out and removed. In this embodiment, the sensible heat in the overhead stream from the scrubbing zone is utilized in a heat exchanger, such as a cooler or a second waste-heat boiler to produce steam at a pressure in the range of about 0 to 2,000 psig or both. As the process gas stream is thereby cooled to a temperature of about 600° F. to ambient, water and any remaining volatilized hydrocarbons in the gas stream are condensed out. Separation of the water and oil from the effluent synthesis gas and from each other may be effected in a first gas-liquid separator or decanter. Preferably, the condensed hydrocarbons from the scrubber overhead stream and the light liquid hydrocarbon fraction from the distillation zone are mixed with the particulate carbon-heavy liquid hydrocarbon slurry leaving the gas-scrubbing zone to constitute at least a portion of the feed to the reaction zone of the synthesis gas generator. Optionally, the process may be operated without returning particulate carbon to the synthesis gas generator, for example when it is desired to reduce the amount of ash in the system. This may be accomplished by withdrawing from the system for use as fuel elsewhere, all or a portion of the particulate carbon-heavy liquid hydrocarbon slurry leaving the first stage of the scrubbing zone or the heavy liquid hydrocarbon fraction-particulate carbon dispersion leaving the third stage or fourth stage, or both. Effluent product gas from the top of the first gas-liquid separator may be cooled still further to a temperature in the range of about 150° F. to ambient ° F. thereby condensing out any remaining water and drying the product gas. Water is separated from the effluent product stream of synthesis gas in a second gas-liquid separator. Water drained from two gas-liquid separators may be utilized, possibly after treating, in the aforesaid waste-heat boilers for making steam.

Optionally, the $H_2/CO$ ratio in the effluent gas from the gas generator may be adjusted by feeding steam produced downstream in a waste heat boiler at a temperature of at least 300° F. and suitably in the range of 400° to 1,600° F. to a reaction chamber or to the connecting line or space between the exit of the synthesis gas generator and the entrance to the waste-heat boiler. Sufficient steam is added to provide a $H_2O/CO$ mole ratio in the range of about 0.5 to 6.0, before the steam reacts. In such instance by noncatalytic water-gas shift at a temperature in the range from about 2,800° F. down to 1,500° F., CO in the effluent synthesis gas reacts with $H_2O$ to produce $H_2$ and $CO_2$. By this means the hydrogen content of the product gas is increased, and effluent product gas may be produced with an $H_2/CO$ ratio between 0.9 and 4.0.

DESCRIPTION OF THE DRAWING AND EXAMPLE

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described. Quantities have been assigned to the various streams so that the description may also serve as an example.

Reference is made to the drawing and the following description where the quantities are specified on an hourly basis. About 86,100 pounds (lbs) of fresh liquid hydrocarbon feedstock in line 200 are passed into heat exchanger 201 and heated to a temperature of about 550° F. by indirect heat exchange with a heavy liquid hydrocarbon fraction produced subsequently in the process from line 202. The preheated liquid hydrocarbon feedstock is then introduced into distillation column 1 by way of line 2.

Stripping tower 1 is a conventional bubble-cap distillation apparatus containing a plurality of trays. It is operated at a pressure in the range of about 0 to 50 psig and a bottoms temperature in the range of about 500° to 1,000° F. By means of stripping tower 1, the fuel oil feed from line 2 is preferably separated into two fractions — a light hydrocarbon fraction, i.e., 650°–900° F. cut which leaves from the top of tower 1 by way of line 3, and a heavy liquid hydrocarbon fraction, i.e., 900+° F. cut which leaves from the bottom of tower 1 by way of line 4. Properties of the fresh liquid hydrocarbon feedstock used in this example, e.g., Arabian Light Crude 650+° F. reduced crude, in line 2 are shown in Table I along with the properties of streams 4, 6 and 106.

About 27,191 lbs of overhead hydrocarbon vapors leaving from stripping tower 1 by way of line 3 are condensed by means of cooler 5 to produce the light liquid hydrocarbon fraction which is passed through line 6 into separation tank 7. Optionally, to improve the separation of the feedstock in stripping tower 1 and to produce stream 4 at a lower temperature, nitrogen may be introduced at the bottom through line 8, valve 9, and line 10. The nitrogen passes overhead along with the light hydrocarbon vapors, through cooler 5 and into tank 7. Nitrogen, leaving tank 7 through line 11, valve 12, and line 13, may be recycled to stripping tower 1. About 417 lbs of a light hydrocarbon liquid condensed from the gases leaving gas scrubbing tower 24, to be further described, are also introduced into holding tank 7 by way of line 14. Optionally, when necessary a portion of fresh liquid hydrocarbon feedstock may be introduced into tank 7 by way of line 15, valve 16, and line 17.

The mixture of hydrocarbon liquids from the bottom of tank 7 is then passed into hold-up tank 18 by way of line 19, valve 20, line 21, pump 22 and line 23. About 59,965 lbs of a slurry of particulate carbon-heavy liquid hydrocarbon fraction from the bottom of gas scrubbing tower 24 are also passed into tank 18 by way of line 25, control valve 26, and lines 27 and 28. Optionally, all or a portion of this slurry may be withdrawn from the system for use elsewhere as a fuel by way of line 29, valve 30, and line 31.

By means of pump 32, about 87,573 lbs of liquid hydrocarbon-particulate carbon slurry from the bottom of tank 18 at a temperature of about 550° F. are pumped through lines 33–35, valve 36 and lines 37–38 and are introduced into synthesis gas generator 39 by way of the annulus passage in axially aligned burner 40. Optionally, a portion of the aforesaid slurry from the bottom of tank 18 may be removed from the system for use elsewhere as heater fuel by way of line 41, valve 42, and line 43. About 34,440 lbs of steam at a temperature of 260° F. from line 44 are preferably admixed in line 38 with the slurry feed from line 37.

Synthesis gas generator 39 comprises a compact free-flow unpacked noncatalytic cylindrical combustion chamber contained in a carbon-steel pressure vessel lined with successive layers of refractory 45. Burner 40 is preferably a water-cooled annulus burner, such as described in U.S. Pat. No. 2,928,460 issued to DuBois Eastman et al. 1,108,000 standard cubic feet per hour (SCFH) of pure oxygen contained in a stream having an oxygen purity of 99.5 mole percent in line 46 at a temperature of 300° F. is passed through the center passage 47 of burner 40 and into the unpacked reaction zone 48 of synthesis gas generator 39. The reactants are quickly and thoroughly mixed as soon as they are introduced into the reactor in order to prevent thermal decomposition and coke formation. Reaction takes place in the gas generator at an autogenous temperature of about 2,507° F and at a pressure of about 1,500 psig.

About 117,417,000 standard cubic feet per day (SCFD) of effluent product gas (wet basis) containing about 2 weight percent of entrained particulate (based on the weight of carbon in the fresh unreacted liquid hydrocarbon in line 37) leave from the axially located bottom exit port 49 of synthesis gas generator 39. The hot effluent product gas is passed through refractory-lined flanged connecting line 50 and into a conventional waste heat boiler 51. Optionally, steam may be introduced into line 50 by way of lines 202-203 and valve 204 to react with CO in the product gas. Additional hydrogen is produced by the thermal noncatalytic water-gas shift reaction. In waste heat boiler 51, by indirect heat exchange with water entering by way of line 52 and leaving by way of line 53 as 1,600 psig steam, the effluent product gas at substantially the same pressure as in gas generator 39 is cooled to a temperature of about 600° F. and leaves by way of line 54.

In a gas-liquid scrubbing zone comprising a closed ended two compartment gas scrubbing tower 24 integrated with a nozzle gas scrubber 55 about 1,473 lbs per hour of particulate carbon entrained in the cooled effluent product gas from line 54 are eventually recovered as the aforesaid slurry of particulate carbon-heavy liquid hydrocarbon fraction in line 25 at the bottom of scrubbing tower 24. In this embodiment, scrubbing tower 24 is divided into two separate gas scrubbing compartments-upper chamber 56 and lower chamber 57 with the floor of the upper chamber serving as the roof of the lower chamber. Both chambers are at substantially the same pressure, i.e., about 1,500 psig. The scrubbing fluid is heated from a temperature of about 400° to 600° F. in the gas scrubbing tower.

Lower chamber 57 of scrubbing tower 24 comprises open ended dip tube 58 surrounded by concentric pipe 59. Pipe 59 is open at both ends and forms annular passage 60 with the outside surface of dip tube 58. Flat ring plate 61 seals the annular space between the top end of pipe 59 and the inside wall of the scrubbing tower. In operation the effluent product gas from line 54 is introduced below the surface 62 of a pool of the aforesaid slurry of particulate carbon-heavy liquid hydrocarbon fraction at a temperature of about 600° F. and containing about 2.5 wt. percent of particulate carbon. The slurry pool is formed from a heavy liquid hydrocarbon fraction-particulate carbon dispersion leaving upper chamber 56 containing about 0.25 weight percent of particulate carbon and being introduced into the bottom portion of lower chamber 57 by way of flanged inlet 63. The effluent gas bubbles up through annulus 60 and into space 64. The velocity and volume of gases produces a turbulent condition which helps to scrub the bulk of the entrained particulate carbon from the effluent product gas. Surface level 62 is maintained by means of level transmitter 65, level controller 66, and control valve 26.

The once scrubbed product gas leaves lower chamber 57 by way of flanged outlet 67 and is introduced into nozzle-type gas-scrubber 55 by way of line 68. By means of injection nozzles 69, heavy liquid hydrocarbon fraction-particulate carbon dispersion from line 70 to be further described, is injected into the accelerated product gas stream flowing at a velocity of about 300 feet per second in throat 71 of nozzle type gas scrubber 55. Thus, a multitude of very fine oil droplets as produced in nozzle gas scrubber 55 provides a second liquid-gas scrubbing.

A third and final scrubbing is effected in upper chamber 56 wherein the dispersion of liquid hydrocarbon droplets in high-velocity process gas stream leaving nozzle gas scrubber 55 is contacted with the heavy liquid hydrocarbon fraction originating from line 4 at a temperature of about 400° F. Preferably this third gas-liquid scrubbing is effected by means of cross-flow multitrays, for example, four trays equipped with bubble caps as shown on pages 18–3 to 7 of Perry's Chemical Engineers' Handbook, Fourth Edition, 1963 McGraw-Hill. The dispersion of liquid hydrocarbon droplets in the high-velocity process gas stream as produced by nozzle gas scrubber 55 is introduced through flanged inlet 72 at the lower part of the upper chamber 56 of gas scrubbing tower 24, preferably through a dip-leg not shown. The process gas stream then flows up through chamber 56 and is contacted with 58,909 lbs of fresh heavy liquid hydrocarbon fraction which enters through flanged inlet 73 at the top of upper chamber 56. The fresh heavy liquid hydrocarbon fraction was produced in stripping tower 1, as previously described. By means of pump 74, stripping tower bottoms are passed through lines 4, 75, 202, heat exchanger 201, 76, and flanged inlet 73. A portion of the heavy liquid hydrocarbon fraction is recycled through line 77, valve 78, line 79, heater 80, and line 81 into the bottom of stripping tower 1.

The heavy liquid hydrocarbon fraction enters upper chamber 56 at a temperature of about 400° F. and flows across each tray while in contact with the product gas which enters as a gas-liquid dispersion through inlet 72 at a temperature of about 600° F. Further, the liquid cascades from tray to tray until it is discharged at the bottom of upper chamber 56 through flanged outlet 82 at a temperature of about 600° F. removing with it substantially all of the remaining particulate carbon entrained in the product gas.

By means of pump 83, about 59,965 lbs of the heavy liquid hydrocarbon fraction-particulate carbon dispersion from the bottom of upper chamber 56 are pumped through lines 84–87 and flanged inlet 63 into lower chamber 57 of the gas scrubbing tower 24, as mentioned previously. Also a second stream of said dispersion is injected into the throat of nozzle gas scrubber 55, as previously mentioned, by way of line 88, valve 89, and line 70. Optionally, a portion of the dispersion may be removed from the system and used elsewhere as a fuel or as part of the feedstock by way of line 90, valve 91, and line 92.

About 117,417,000 SCFD of thoroughly scrubbed wet synthesis gas leave gas scrubbing tower 24 by way of line 93 at a temperature of about 540° F. and having the following analysis in mole percent wet basis: $H_2$–42.38, CO–42.78, $CO_2$–3.87, $H_2O$–9.56, $H_2S$–0.56, COS–0.03, A–0.11, $N_2$–0.10, and $CH_4$–0.61. Further, the product gas stream contains substantially no entrained particulate carbon, i.e., not more than about 1 part per million and less than about .0075 mole percent of vaporized hydrocarbon. The product stream may be withdrawn from the system by way of line 94, valve 95, and line 96 and reacted with additional steam in a catalytic water-gas shift converter to produce hydrogen.

Alternately, when it is desired to dry the process gas stream and condense out any volatilized hydrocarbons flashed overhead from the scrubbing tower, the overhead gases leaving gas scrubbing tower 24 are introduced into waste-heat boiler 97 by way of line 98, 99 and valve 100 and cooled by indirect heat exchange with water. The water is fed into waste-heat boiler 97 by way of line 101. Steam at a pressure of 150 psig is generated and leaves by way of line 102.

Cooled effluent product gas having a dewpoint of about 355° F. leaves waste-heat boiler 97 at a temperature of about 358° F. and is introduced into gas-liquid separator 103 by way of line 104. About 417 lbs of entrained light liquid hydrocarbon as described in Table I (stream 106) are thereby separated by gravity in separator 103. This amount represents about 0.84 mole percent of the 900+° F. scrubbing oil. In some cases, a small amount of water separates out and may be drawn off by way of line 105. The light hydrocarbon liquid is drawn off by way of line 106 and is passed through valve 107 and line 14 into hold-up tank 7 for feed to synthesis-gas generator 39, as previously described.

Effluent product gas leaving from the top of separator 103 by way of line 108 is cooled to a temperature of 90° in cooler 109 and is then passed through line 110 into gas-liquid separator 111. About 22,201 lbs/hr. of water are removed by way of line 112 at the bottom of separator 111. About 106,194,000 SCFD of dry product gas scrubbed free from entrained particulate carbon and containing substantially no volatilized hydrocarbons and having the following composition in mole percent dry basis are removed through line 113 at the top of separator 111. CO–47.30, $H_2$–46.86, $CO_2$–4.28, $CH_4$–0.68, A–0.13, $N_2$–0.11, $H_2S$–0.61, and COS–0.03.

To illustrate the unexpected and improved results obtained by the subject process, the 900+° F. Arabian Light resid scrubbing fluid (stream 76) is replaced with a 400+° F. cut of Arabian Light resid having an atmospheric i.b.p. per ASTM D86 of about 400° F. The operating conditions and stream flows in the scrubbing zone are substantially the same as described in the previous case i.e., 600° F. and 1,500 psig.

With 400+° F. Arabian Light resid as the scrubbing fluid, about 32 mole precent of the scrubbing fluid is vaporized in the tower 24 and passes overhead with the process gas stream. This quantity of oil vapor would interfere with downstream processes and put additional thermal and handling burdens on the process.

TABLE I

PROPERTIES OF STREAMS

| Stream No. | 2 | 6 | 4 | 106 |
|---|---|---|---|---|
| Description | 650+°F. Arabian Light Reduced Crude | 650–900°F. Cut From Stream 2 | 900+°F. Cut From Stream 2 | Vaporized Oil From Scrubber |
| Gravity, °API | 17.6 | 30.2 | 11.8 | 14.2 |
| Molecular Weight | 410 | 288 | 510 | 430 |
| Characterization Factor | 11.85 | 11.80 | 11.56 | |
| Viscosity, CS at 122°F. | 161 | 9.7 | 4931 | |
| CS at 210°F. | 21.4 | 3.2 | 197 | |
| Sulfur Content, Wt. % | 2.8 | 1.5 | 3.4 | |
| Carbon Residue, Wt. % | 7.6 | 0.01 | 11.1 | |

In comparison by the subject invention as previously mentioned, only 0.84 mole percent of the 900+° F. Arabian Light resid scrubbing fluid are flashed overhead from scrubbing tower 24 under the same conditions of operation. This small amount of hydrocarbon vapor may be tolerated in most downstream processes. Thus, by the subject invention a product stream of synthesis gas leaving the scrubber is available for use at higher temperatures. Further, expensive purification steps are avoided.

The process of the invention has been described generally and by example with reference to liquid hydrocarbon feedstocks and scrubbing fluids of particular compositions for purposes of clarity and illustration only. It will be apparent to those skilled in the art from the foregoing that the various modifications of the process and the materials disclosed herein can be made without departure from the spirit of the invention.

I claim:

1. In a process for the production of an effluent gas stream comprising principally carbon monoxide and hydrogen in the reaction zone of a free-flow noncatalytic gas generator by direct partial oxidation of a liquid hydrocarbon fuel feed having a gravity in the range of about −15° to 40° API with a free-oxygen containing gas in the range of about 0.7 to 1.2 atoms of free-oxygen per atom of carbon in the feed and steam in the range of about 0.1 to 5 parts by weight of steam per part by weight of liquid hydrocarbon fuel at an autogenous temperature within the range of about 1,500° to 3,000° F. and a pressure in the range of about 1 to 250 atmospheres to produce said effluent gas stream comprising principally carbon monoxide and hydrogen and containing about 0.1 to 10 weight percent (basis weight of hydrocarbon feed) of entrained particulate carbon which is removed from said effluent gas stream by scrubbing with a liquid hydrocarbon fluid, and wherein without the subject improvement more than 10 mole percent of said liquid hydrocarbon scrubbing fluid would voltalize into said effluent gas stream, the improvement which comprises:

1. introducing said liquid hydrocarbon fuel feedstock into a distillation zone at a pressure of less than 50 psig, and separating said hydrocarbon fuel feedstock into one or more light liquid hydrocarbon fractions whose initial atmospheric boiling points are in the range of about 100° to 900° F. and a separate heavy liquid hydrocarbon fraction having an initial atmospheric boiling point of over 900° F.;

2. cooling the effluent gas stream from said gas generator to a temperature of about 600° F. by indirect heat exchange with water in a cooling zone thereby producing steam;

3. intimately contacting and scrubbing the cooled effluent gas stream from (2) in a scrubbing zone at a pressure of at least 1,500 psig with scrubbing fluid having a temperature in the range of about 400° to 600° F., said scrubbing fluid being selected from the group consisting of heavy liquid hydrocarbon fraction as produced in step (1) and a dispersion comprising said heavy liquid hydrocarbon fraction and particulate carbon; producing a particulate carbon-liquid hydrocarbon slurry and an effluent gas stream product comprising principally carbon monoxide and hydrogen that is substantially free from entrained particulate carbon and wherein less than 10 mole percent of said heavy liquid hydrocarbon scrubbing fluid is volatilized into said effluent gas stream product.

2. The process of claim 1 further provided with the step of introducing at least a portion of the particulate carbon-liquid hydrocarbon slurry of (3) in admixture with at least a portion of the light liquid hydrocarbon fraction of (1) into said partial oxidation reaction zone of said gas generator as feed; and wherein the pressures in said cooling and scrubbing zones are substantially the same as the pressure in said gas generator less ordinary drop in the line.

3. The process of claim 1 whereby the contacting and scrubbing in step (3) is effected in said scrubbing zone by;

a. introducing the cooled effluent gas stream from step (2) below the surface of a portion of said heavy liquid hydrocarbon fraction-particulate carbon dispersion scrubbing fluid contained in a vessel, whereby said scrubbing fluid enters said vessel as a liquid dispersion containing about 0.2 to 1.5 weight percent of particulate carbon and leaves said vessel as a liquid dispersion containing about 2 to 20 weight percent of particulate carbon;

b. passing the effluent gas stream leaving (a) through the axial passage of a nozzle-type gas scrubber at a velocity in the range of about 100 to 400 ft. per second, employing said effluent gas stream to atomize a scrubbing fluid consisting of a portion of said heavy liquid hydrocarbon fraction-particulate carbon dispersion containing about 0.2 to 1.5 weight percent of particulate carbon into fine droplets and collecting particulate carbon from the effluent gas stream onto these drops, whereby from about 5 to 10 gallons of said scrubbing fluid per 1,000 standard cubic feet of effluent gas are injected into the effluent gas stream at the throat of said nozzle gas scrubber; and c. initmately contacting the effluent gas stream leaving (b) in a vessel with a portion of the heavy liquid hydrocarbon fraction produced in step (1) to produce said heavy liquid hydrocarbon fraction-particulate carbon dispersion containing about 0.2 to 1.5 weight percent of particulate carbon for use in steps (a) and (b), whereby substantially all of the entrained particulate carbon is removed from said effluent gas stream product.

4. The process of claim 1 wherein the cooling of said effluent gas stream in step (2) is effected by indirect heat exchange with water in a waste-heat boiler and a portion of the steam thereby produced is supplied to provide heat in the distillation zone of step (1).

5. The process of claim 1 further provided with the steps of cooling the effluent product gas stream from step (3) to a temperature below the dew point, and condensing out and separating water and any volatilized hydrocarbon from said product gas stream and from each other.

6. The process of claim 4 further provided with the step of mixing a sufficient amount of the steam produced in said waste-heat boiler with said effluent gas stream from said reaction zone so that the $H_2O/CO$ mole ratio of the gaseous mixture is in the range of about 0.5 to 6, and reacting said gaseous mixture in a separate reaction zone by the noncatalytic water-gas shift reaction at a temperature in the range of about 2,800° to 1,500° F. to increase the amount of hydrogen in said effluent gas stream.

7. The process of claim 4 further provided with the steps of mixing a portion of the steam produced in said waste-heat boiler with the effluent product gas stream leaving the scrubbing zone producing a gaseous mixture having a $H_2O/CO$ mole ratio in the range of about 0.5 to 6; and reacting said gaseous mixture at a temperature in the range of about 350° to 1,050° F. over a water-gas shift catalyst selected from the group consisting of promoted iron oxide, and supported sulfided cobalt-molybdenum oxide, so as to produce a shifted product gas stream containing an increased amount of hydrogen.

* * * * *